(12) United States Patent
Muramatsu et al.

(10) Patent No.: US 6,679,364 B2
(45) Date of Patent: Jan. 20, 2004

(54) ONE-WAY CLUTCH ASSEMBLY

(75) Inventors: Kazuhiko Muramatsu, Fukuroi (JP); Nobuhiro Horiuchi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/118,925

(22) Filed: Apr. 10, 2002

(65) Prior Publication Data

US 2002/0148697 A1 Oct. 17, 2002

(30) Foreign Application Priority Data

Apr. 12, 2001 (JP) ........................................ 2001-114007

(51) Int. Cl.[7] ............................................... F16D 41/12
(52) U.S. Cl. .................. 192/46; 192/55.61; 192/113.32
(58) Field of Search ............................. 192/46, 55.61, 192/110 B, 113.32

(56) References Cited

U.S. PATENT DOCUMENTS

| | | | | | |
|---|---|---|---|---|---|
| 1,252,893 A | * | 1/1918 | Ellett | ........................... | 192/46 |
| 2,226,247 A | * | 12/1940 | Lesage | ........................... | 192/64 |
| 4,711,331 A | * | 12/1987 | Hoffmann | ..................... | 192/46 |
| 5,052,518 A | * | 10/1991 | Trommer | .................... | 184/6.12 |
| 5,816,377 A | * | 10/1998 | Nakamura | .................... | 192/64 |
| 5,853,073 A |   | 12/1998 | Costin | ........................... | 192/46 |
| 2002/0005327 A1 | * | 1/2002 | Muramatsu et al. | ........... | 192/46 |

FOREIGN PATENT DOCUMENTS

JP          57161326 A   *  10/1982  ............ F16D/41/07

* cited by examiner

*Primary Examiner*—Richard M. Lorence
(74) *Attorney, Agent, or Firm*—Miles & Stockbridge P.C.

(57) ABSTRACT

A one-way clutch assembly comprising a ratchet one-way clutch portion includes inner and outer races which are disposed in coaxial with each other, a pawl capable of being fitted into a recess provided in the inner or outer race to transmit torque, and a biasing member for biasing the pawl to promote the fitting, and a bearing portion disposed between the inner race and the outer race.

4 Claims, 3 Drawing Sheets

PRIOR ART FIG. 5

ONE-WAY CLUTCH ASSEMBLY

BACKGROUND OF THE INVENTION

1. Field of the Invention

The present invention relates to a ratchet one-way clutch using a ratchet (pawl) as a lock mechanism, among one-way clutches used in a transmission in an automobile, a farm machine, a building machine, an industrial machine and the like, particularly, in an automatic transmission of a vehicle and having a function such as back-stop. More particularly the present invention relates to a ratchet one-way clutch having a bearing portion.

2. Related Background Art

In general, a one-way clutch used in an automatic transmission has outer and inner races which are rotated relative to each other so that torque can be transmitted only in one direction when sprag or a roller for transmitting the torque between the outer and inner races is engaged by a cam surface provided on a track face of the outer or inner race. On the other hand, the clutch is idly rotated in the other direction.

Among such one-way clutches, there is a ratchet one-way clutch having a ratchet as a torque transmitting member for transmitting the torque between the outer and inner races. The ratchet one-way clutch includes an outer race having a pocket in an inner periphery thereof, an inner race disposed in coaxial with the outer race and having a notch in an outer periphery thereof, a pawl contained in the pocket and maintaining the one-way clutch in a locking condition by fitting the pawl into the notch thereby to transmit torque between the inner and outer races, and an elastic member such as a spring for biasing the pawl toward the inner race. In recent years, development regarding compactness, weight reduction and cost reduction of part of an automobile such as an automatic transmission has been made widely, and the one-way clutch is also included in such development. To satisfy such requirement, usage of the ratchet one-way clutch has been proposed.

In the ratchet one-way clutch having the above-mentioned construction, when the one-way clutch is rotated in one direction, since the pawl is feely slid with respect to the outer periphery of the inner race, the outer and inner races are idly rotated relative to each other. Then, when the one-way clutch tried to rotate in the other direction, the pawl is fitted into the notch so that the one-way clutch becomes the locking condition.

FIG. 5 is a partial front view of a conventional ratchet one-way clutch and shows an example that a hub of the clutch is used as an outer race. The ratchet one-way clutch 101 has an inner race 102 and an outer race 122 which are disposed in coaxial with each other, and pawl 123 is provided on an inner peripheral portion of the outer race 122 and is biased by a garter spring 124. In this ratchet one-way clutch 101, when the inner race 102 and the outer race 122 are rotated relative to each other in a predetermined direction, the pawl 123 is fitted into a recess provided in the outer periphery of the inner race 102 thereby to transmit the torque, and, when the races are rotated relative to each other in a reverse direction, the clutch is idly rotated. Further, splines are provided on the inner periphery of the inner race 102 and the outer periphery of the outer race 122. Incidentally, an example of such a ratchet one-way clutch is disclosed in U.S. Pat. No. 5,853,073 in detail.

In conventional one-way clutches including the ratchet one-way clutch, in many cases, although bearings are disposed in coaxial with each other, problems regarding compactness, weight reduction and reduction in the number of parts of the automatic transmission which must satisfy recent severe requirements have still be remained.

SUMMARY OF THE INVENTION

Therefore, an object of the present invention is to provide a one-way clutch assembly which achieves compactness, weight reduction and reduction in the number of parts of an automatic transmission by constructing a ratchet one-way clutch and a bearing as a single assembly.

To achieve the above object, the present invention is characterized by a one-way clutch assembly comprising a ratchet one-way clutch portion including inner and outer races which are disposed in coaxial with each other, a pawl capable of being fitted into a recess provided in the inner or outer race to transmit torque, and a biasing member for biasing the pawl to promote the fitting, and a bearing portion disposed between the inner race and the outer race.

The bearing used in the present invention is not particularly limited and, various bearings rolling bearing such as a deep groove ball bearing, a magnet ball bearing, an angular ball bearing, a multiple line angular ball bearing, a combined angular ball bearing, a four-point contact ball bearing, an automatic centering ball bearing, a cylindrical roller bearing, a multiple line cylindrical roller bearing, a single-flanged cylindrical roller bearing, a flange-wheeled cylindrical roller bearing, a needle roller bearing, a conical roller bearing, a multiple line/multiple strand conical roller bearing, an automatic centering roller bearing, a thrust ball bearing, a centering washer thrust ball bearing, a dual thrust angular ball bearing, a thrust cylindrical roller bearing, a thrust conical roller bearing and a thrust automatic centering roller bearing may be used.

Further of course, various bearings in which phosphorus bronze, lead bronze, high lead bronze, babbit, aluminum alloy, cadmium alloy or silver plating is used as bearing alloy and bimetallic material using steel, cast iron and bronze or solid material using iron, stainless steel and special alloy such as copper alloy or iron coated by copper or lead is used as backing plate can be used. In addition, a tightly sealed bearing with a seal can be also used.

Although any material for the outer race of the ratchet one-way clutch can be used, it is preferably made of aluminum. When the outer race is made of aluminum, the weight of the one-way clutch can be reduced and the one-way clutch can be manufactured by die casting, thereby improving productivity.

The outer race of the bearing can be incorporated into the outer race of the ratchet one-way clutch, because, when the outer race of the ratchet one-way clutch is made of aluminum as mentioned above, if the aluminum portion is used as the outer race of the bearing as it is, strength may become insufficient.

BRIEF DESCRIPTION OF THE DRAWINGS

FIG. 5 is a partial front view of a conventional ratchet one-way clutch.

DETAILED DESCRIPTION OF THE PREFERRED EMBODIMENTS

Figure 1:
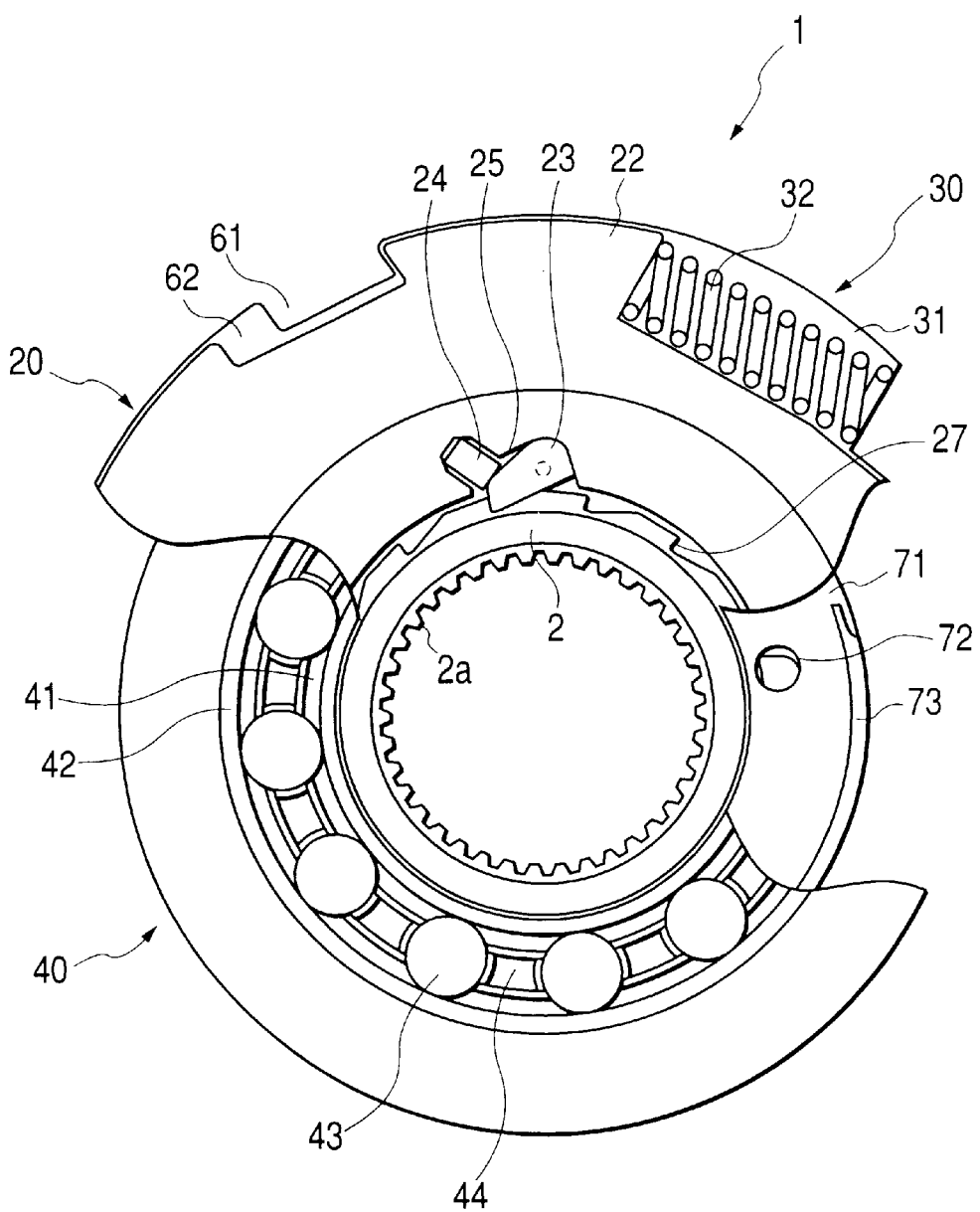
FIG. 1 is a partial sectional view showing a first embodiment of the present invention.

Now, the present invention will now be fully explained in connection with embodiments thereof with reference to the accompanying drawings. Incidentally, in the drawings, the same elements are designated by the same reference numerals. Further, in embodiments which will be described hereinbelow, although a deep groove ball bearing is used in a bearing portion, it should be noted that other bearing can be used as mentioned above.

First Embodiment

Figure 2:
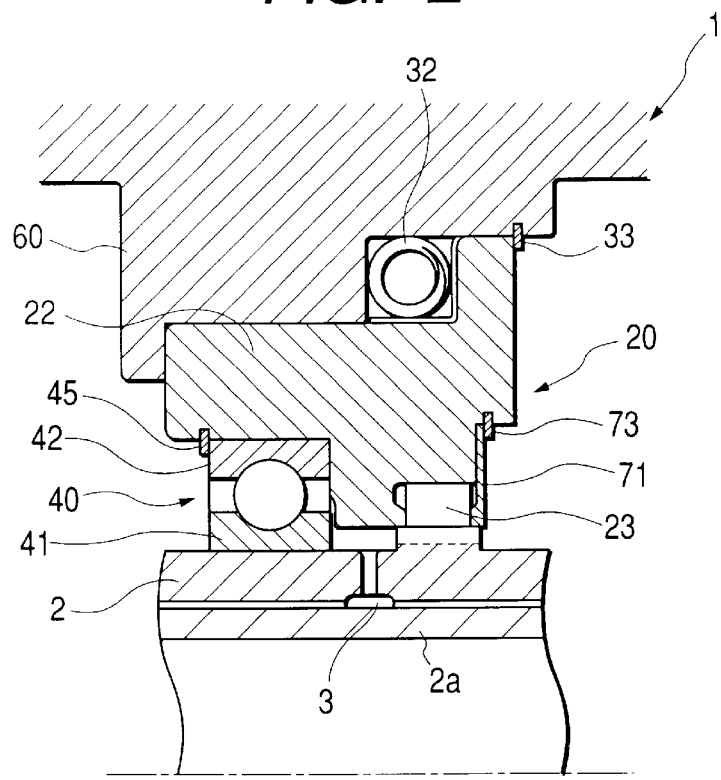
FIG. 2 is an axial sectional view showing the first embodiment of the present invention.
Figure 3:
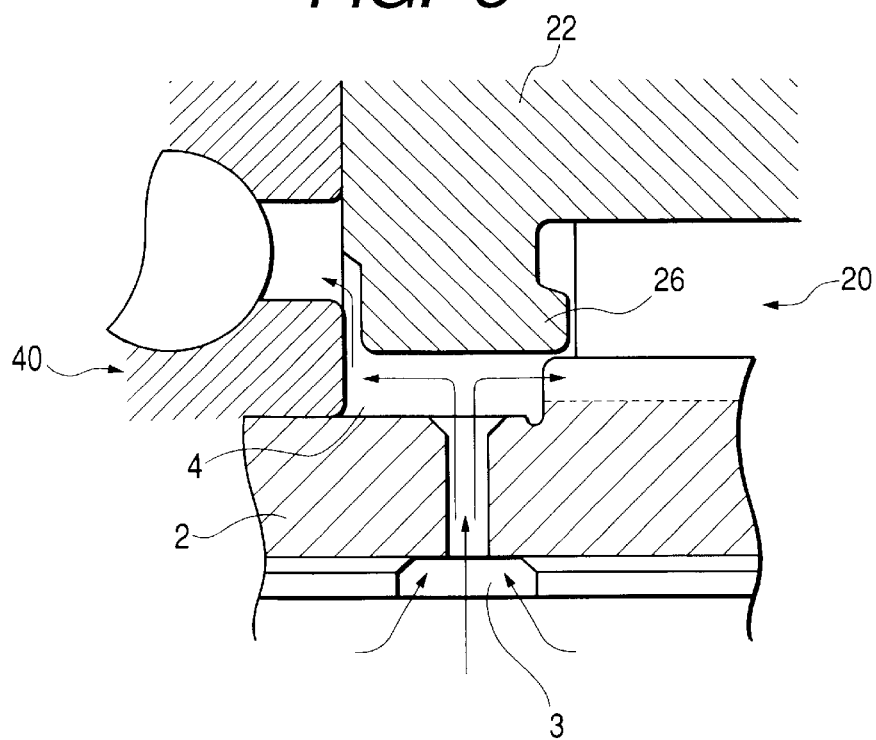
FIG. 3 is a partial enlarged view of FIG. 2.

FIGS. 1 to 3 show a first embodiment of the present invention. FIG. 1 is a partial fragmental front view showing a one-way clutch assembly 1 according to the first embodiment of the present invention. FIG. 2 is an axial sectional view showing the one-way clutch assembly according to the first embodiment. FIG. 3 is a partially enlarged view of FIG. 2.

As shown in FIGS. 1 and 2, the one-way clutch assembly 1 includes a ratchet one-way clutch portion 20, a bearing portion 40 disposed in coaxial with the ratchet one-way clutch portion 20, and a damper portion 30.

The ratchet one-way clutch portion 20 includes an inner race constituted by a hollow shaft 2 having splines 2a provided on an inner periphery thereof and fitted in a shaft (not shown), and an outer race 22 disposed in coaxial with the inner race 2 and rotated relative to the inner race. A pawl 23 is disposed in each of pockets 25 provided in an inner peripheral portion of the outer race 22, and the pawl 23 is biased by a biasing member or spring 24 to be fitted into one of recessed portions 27 provided in an outer periphery of the inner race 2.

The pawl 23 and the spring 24 are axially supported by a side plate 71, and the side plate 71 is fixed in an axial direction by a snap ring 73 secured to the outer race 22. Further, the side plate 71 is provided with a hole 72 through which lubricating oil is passed and supplied. The spring 24 biases the pawl 23 toward the outer periphery of the inner race 2 to promote the fitting between the pawl 23 and the recessed portion 27. With this arrangement, in the ratchet one-way clutch portion 20, when the inner race 2 and the outer race 22 are rotated relative to each other in a predetermined direction, the pawl 23 is engaged by the recessed portion 27 to transmit torque, and, when they are rotated in an opposite direction, the clutch is idly rotated.

A plurality of pockets 25 provided in the inner periphery of the outer race 22 are disposed equidistantly among a circumferential direction, and the pawls 23 are housed in the respective pockets 25. Further, the number of recessed portions (stepped portions) greater than the number of plural pawls 23 are provided in the outer periphery of the inner race 2. The numbers of these elements can be selected appropriately and are not limited to the illustrated numbers and can be increased or decreased if necessary.

The bearing portion 40 is constituted by an inner race 41, and outer race 42, rolling members or balls 43 rolling between the inner and outer races, and a holder 44. The inner race 41 is secured to the outer periphery of the inner race 2 of the ratchet one-way clutch portion 20 by shrink fit or press fit, and the outer race 42 is attached to the inner periphery of the outer race 22 of the ratchet one-way clutch portion 20 by press fit and fixed axially by an annular snap ring 45. A stopper member 33 axially holds an outer race 22 in a substantially fixed state. By the bearing portion 40, a coaxial relationship between the inner race 2 and the outer race 22 of the ratchet one-way clutch portion 20 is maintained.

In the damper portion 30, cavities 31, 62 are defined between the outer race 22 and an opponent member 60 to which the ratchet one-way clutch portion 20 is attached, and a spring 32 such as a coil spring is disposed in the cavity 31, and a protruded portion 61 of the opponent member 60 is fitted into the cavity 62. In the ratchet one-way clutch portion 20, when the pawl 23 is fitted in the recessed portion 27 of the inner race 2, the damper portion 30 serves to absorb shock due to backlash by the spring 32. Incidentally, since a circumferential width of the cavity 62 is set to be greater than a circumferential width of the protruded portion 61, a flexed amount of the spring 32 is regulated in the circumferential direction within a range through which the protruded portion 61 and be shifted in the cavity 62, thereby preventing softening and braking of the spring 32. Incidentally, in place of the spring 32, other shock absorbing member such as rubber may be used or a damper of oil closed type may be used.

FIG. 3 is an enlarged view of FIG. 1, showing flows of lubricating oil. Arrows in FIG. 3 show the flows of the lubricating oil. The lubricating oil supplied from a lubricating oil source (not shown) is sent to a lubricating oil supply port 3 provided in the inner race 2 and flows toward the outer periphery of the inner race 2. Thereafter, the lubricating oil passes between the outer periphery of the inner race 2 and a support portion 26 of the outer race 22, specifically into a lubricant oil chamber 4 defined by the inner race 2, the outer race 22 and the bearing portion 40, where the flow branches in a direction of the ratchet one-way clutch portion 20 and in a direction of the bearing portion 40.

The lubricating oil supplied to the ratchet one-way clutch portion 20 is discharged from the hole 72 of the side plate 71 as shown in FIG. 1, and the lubricating oil supplied to the bearing portion 40 is discharged from a gap between the inner race 41, outer race 42, balls 43 and holder 44.

Incidentally, the lubricating oil supply port 3 may be provided in the inner race 41 of the bearing portion 40. In this case, the lubricating oil from the lubricating oil supply port 3 provided in the inner race 41 of the bearing portion 40 is discharged from the gap between the inner race 41, outer race 42, balls 43 and holder 44 of the bearing portion 40 to the ratchet one-way clutch portion 20 and lubricates the inner race 2, outer race 22 and pawls 23 of the ratchet one-way clutch portion 20. Thereafter, the lubricating oil is discharged out of the assembly through the hole 72 of the side plate 71.

Second Embodiment

Figure 4:
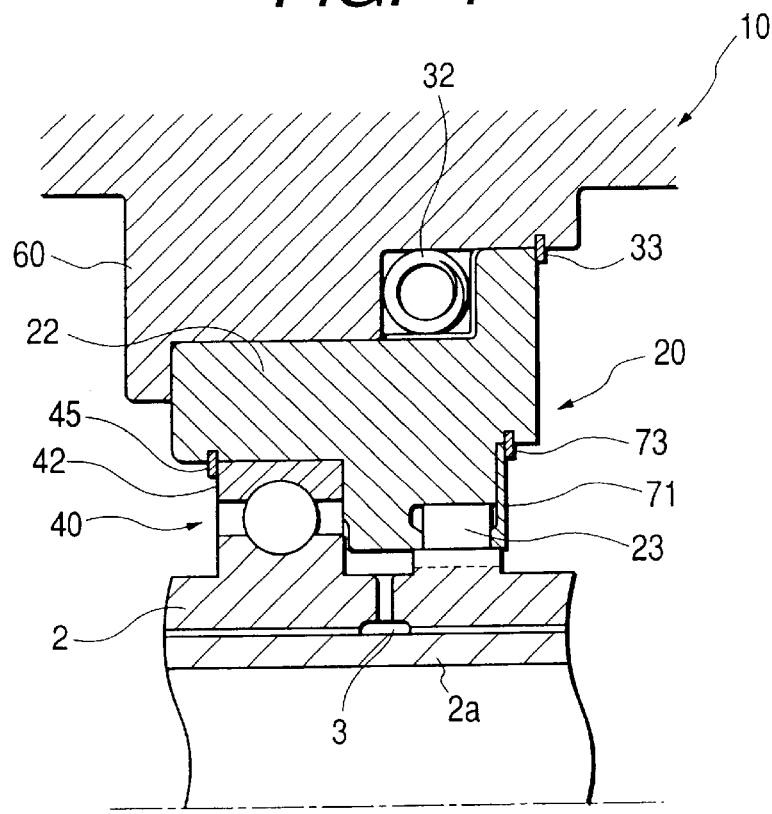
FIG. 4 is an axial sectional view showing a second embodiment of the present invention.
Figure 4:
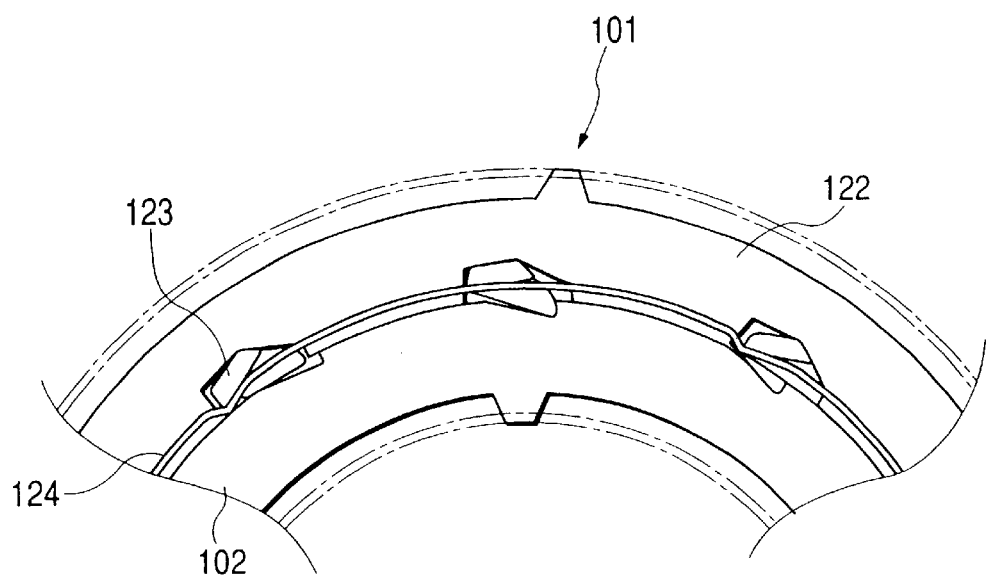

FIG. 4 shows a one-way clutch assembly 10 according to a second embodiment of the present invention. Since the fundamental construction is the same as the one-say clutch assembly 1 according to the first embodiment, only a difference will be explained. In the second embodiment, an inner race of the bearing portion 40 is formed integrally with the inner race 2 of the ratchet one-way clutch portion 20. By adopting such an arrangement, since the inner race of the bearing portion 40 can be used together with the inner race 2 of the ratchet one-way clutch portion 20 in common, the number of parts can be reduced.

In the second embodiment, while an example that the inner race of the bearing portion 40 is formed integrally with the inner race 2 of the ratchet one-way clutch portion 20 was explained, the outer race 42 of the bearing portion 40 may be formed integrally with the outer race 22 of the ratchet one-way clutch portion 20. In this case, however, since the outer race 22 must be made of material other than aluminum, weight reduction may be prevented.

Further, in the above-mentioned embodiments, while an example that the inner race 2 of the ratchet one-way clutch portion 20 is constituted by the hollow shaft was explained, a solid shaft may be used.

According to the present invention as mentioned above, the following technical effects can be achieved.

The ratchet one-way clutch portion and the bearing portion can be constructed as the single assembly, and the compactness, weight reduction and reduction in the number of parts of the automatic transmission can be achieved.

Further, by providing the shock absorbing member between the outer race and the member for holding the outer race, noise and shock in the clutch portion can be suppressed.

By forming the inner race of the ratchet one-way clutch portion integrally with the inner race of the bearing portion, the entire assembly can be made more compact and lightweighted.

Further, by providing the lubricating oil supply port in at least one of the inner race of the ratchet one-way clutch portion and the inner race of the bearing portion, the ratchet one-way clutch portion and the bearing portion can be lubricated more efficiently.

By providing the predetermined gap between the inner peripheral surface of the axial support portion of the outer race of the ratchet one-way clutch portion and the outer peripheral surface of the inner race of the ratchet one-way clutch portion and by using the gap as the lubricating oil path, the lubricating oil path can be defined with space saving.

Further, by providing the side plate for supporting the pawls and the biasing members in the ratchet one-way clutch portion and by providing the hole through which the lubricating oil can flow in the side plate, improvement of lubricating ability can be expected.

What is claimed is:

1. A one-way clutch assembly comprising:

a ratchet one-way clutch portion including inner and outer races which are disposed coaxially with each other, a pawl capable of being fitted into a recess provided in said inner or outer race to transmit torque, and a biasing member biasing said pawl to promote the fitting;

a bearing portion disposed between said inner race and said outer race; and a shock absorbing member disposed between said outer race and a member holding said outer race.

2. A one-way clutch assembly comprising:

a ratchet one-way clutch portion including inner and outer races which are disposed coaxially with each other, a pawl capable of being fitted into a recess provided in said inner or outer race to transmit torque, and a biasing member biasing said pawl to promote the fitting; and a bearing portion disposed between said inner race and said outer race;

wherein a lubricating oil supply port is provided in at least one of said inner race of said ratchet one-way clutch portion and an inner race of said bearing portion.

3. A one-way clutch assembly comprising:

a ratchet one-way clutch portion including inner and outer races which are disposed coaxially with each other, a pawl capable of being fitted into a recess provided in said inner or outer race to transmit torque, and a biasing member biasing said pawl to promote the fitting; and a bearing portion disposed between said inner race and said outer race;

wherein a predetermined gap is provided between an inner peripheral surface of an axial support portion of said outer race of said ratchet one-way clutch portion and an outer peripheral surface of said inner race of said ratchet one-way clutch portion, and said gap is used as a lubricating oil path.

4. A one-way clutch assembly comprising:

a ratchet one-way clutch portion including inner and outer races which are disposed coaxially with each other, a pawl capable of being fitted into a recess provided in said inner or outer race to transmit torque, and a biasing member biasing said pawl to promote the fitting; and a bearing portion disposed between said inner race and said outer race;

wherein said ratchet one-way clutch portion has a side plate supporting said pawl and said biasing member, and said side plate is provided with a hole through which lubricating oil can flow.

* * * * *